United States Patent Office 3,433,071
Patented Mar. 18, 1969

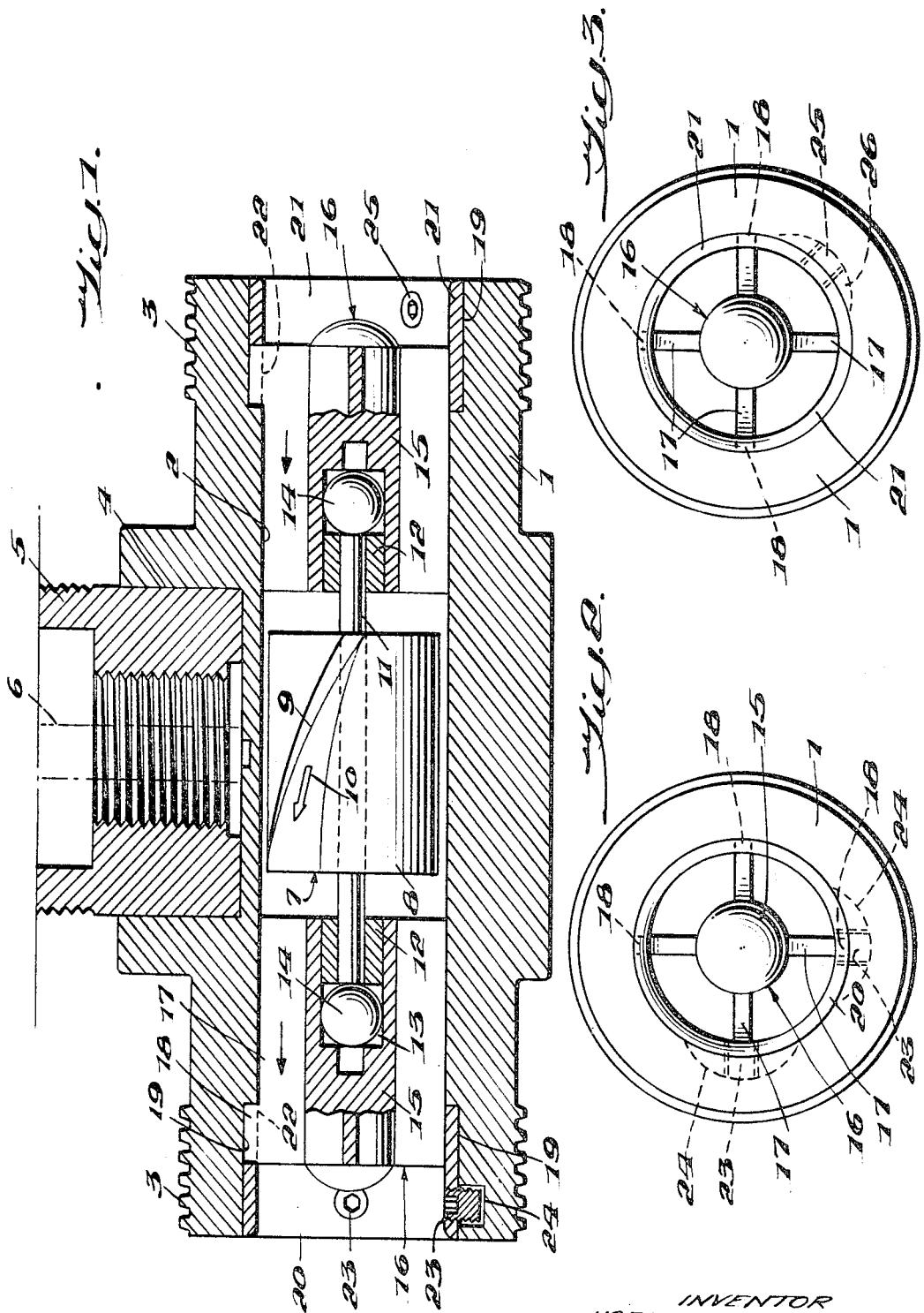

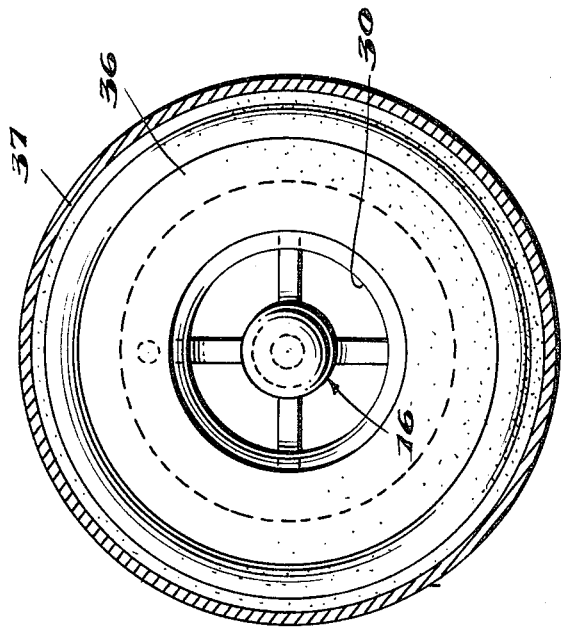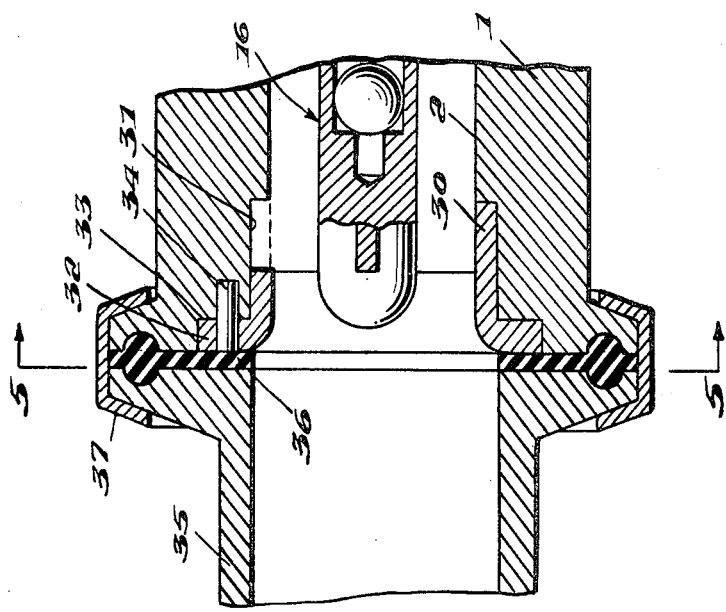

3,433,071
FLOWMETERS
Horace J. Homrig, Duncan, Okla., assignor to Halliburton Company, Duncan, Okla., a corporation of Delaware
Filed Mar. 15, 1966, Ser. No. 534,375
U.S. Cl. 73—231       8 Claims
Int. Cl. G01f 1/06

ABSTRACT OF THE DISCLOSURE

A flowmeter of the type having a central bore with a rotor mounted between bearing supports in the bore. The bearing supports include a plurality of radial vanes which engage the wall of the bore. The vanes are symmetrically disposed around each bearing support and a retaining ring is secured in a counterbore at the end of the meter body for holding the vanes in a proper orientation with respect to the body of the flowmeter. The proper orientation of the vane assemblies is determined by assembling a pair of vane assemblies in a master meter body and rotating one assembly relative to the other to produce minimum turbulence. The position of the retaining rings relative to the body is marked so that the pair of assemblies can be assembled in another meter body in the same orientation. The size and position of the retaining rings provides a substantially constant internal diameter for the fluid passage throughout the entire length of the flowmeter.

---

This invention relates to improvements in flowmeters of the character used for measuring the flow of fluids such as liquids carrying abrasive particles and flowing through a pipe line or the like.

It has been proposed heretofore, according to United States Letters Patent No. 3,164,020, dated Jan. 5, 1965, to provide a flowmeter wherein a rotor is mounted axially of a bore through a meter body and having vanes on the rotor to cause turning movement thereof in response to flow through the line. A suitable pick-up device is associated with the body to respond to the turning movement of the rotor for indicating or recording the flow through the line.

The accuracy of the instrument depends to a substantial degree upon the mounting of the rotor, both as to the alignment of the axis and the location within the bore of the meter body. This requires precise mounting and assembly of the operating parts of the instrument.

Where wear occurs in service, it is often not practical to remove the instrument and to return it to the factory for repair or replacement of the worn parts. It has been difficult heretofore to replace these in the field.

One object of this invention is to overcome these objections and to improve the mounting of the rotor assembly in the body of the meter.

Another object of the invention is to provide a replacing assembly which may be matched accurately in a field installation with few parts which may be assembled accurately even by relatively unskilled labor.

These objects may be accomplished according to certain embodiments of the invention by mounting the rotor on a shaft supported in bearings in the hub portions of vane assemblies. The vane assemblies are made to enter the bore of the body. The body is counterbored at points along the length of the bore such, for example, as at opposite ends of the body to receive retaining rings for the vane assemblies, which retaining rings preferably have inside diameters matching the inside diameter of the throat bore of the body.

The vane assemblies have certain of the blades thereof projecting to the depth of the counterbore and confined by the retaining rings in slots provided in the retaining rings. One of the vane assembly blades has the projection shoulder removed therefrom and the corresponding retaining ring has one less slot than the total number of vane blades so as to determine a single relative position between the vane blades and the retaining ring at assembly. Thus, the parts can be reassembled or assembled in the field in the same relative positions they had at the initial assembly, with assurance that proper match and alignment will be obtained even in a field installation. Suitable locking means is provided for the retaining rings to hold these in place and to assure of proper assembly without using exposed snap rings and retaining grooves.

These embodiments of the invention are illustrated in the accompanying drawings, in which:

FIG. 1 is a longitudinal section through the flowmeter, showing the invention applied thereto;

FIG. 2 is an end elevation of the body at one end thereof;

FIG. 3 is a similar view at the opposite end thereof;

FIG. 4 is a detail cross section through a modified form of retaining ring and coupling assembly; and FIG. 5 is a cross section therethrough on the line 5—5 in FIG. 4.

Referring to the form of the invention illustrated in FIGS. 1 to 3, an elongated tubular body 1, preferably of a nonmagnetic material, has a throat bore 2 extending throughout the length thereof. The bore 2 is of uniform diameter throughout the major portion of the length of the body for flow of fluid through the bore in the direction illustrated by the arrows in FIG. 1. Suitable coupling means, illustrated generally at 3 at opposite ends of the body 1, may be used for connecting the body in a pipe line or other installation where it is desired to use the flowmeter.

The body 1 has a blind opening 4 in one side thereof, according to this embodiment of the invention, in which a case 5 is secured to house a magnetic pick-up assembly, as indicated generally at 6 in FIG. 1. The construction and operation of the pick-up assembly, according to this embodiment, has been illustrated and described more in detail in the aforesaid patent, No. 3,164,020, which is referred to for a better understanding thereof. Any other suitable means known in the art may be used for indicating or recording the flow through the meter which is operative in response to the construction herein described.

Mounted within the bore 2 is a rotor assembly 7 which preferably is of magnetic material when a magnetic pick-up is to be used in association therewith, according to the aforesaid patent. The rotor assembly 7 comprises a hub portion 8 having a suitable number of vanes 9 extending helically on the periphery thereof. Suitable indicia, indicated at 10, may be applied to the rotor or to the vanes to indicate the proper assembly thereof according to the direction of flow of fluid through the instrument.

The rotor assembly 7 is mounted on a shaft 11 which extends axially in opposite directions from the hub portion 8. The hub portion is preferably fixed rigidly to the shaft to rotate therewith.

Each of the opposite ends of the shaft 11 is mounted in a sleeve bearing 12 secured in a recess 13, which also contains a ball thrust bearing 14. The recess 13 is formed in the inner end portion of a hub portion 15 of a vane assembly, generally indicated at 16, and which includes radiating vanes 17 extending laterally from the hub portion 15.

As will be apparent from FIGS. 1 to 3, the vanes 17 radiate in different directions from the periphery of the hub portion 15 of each vane assembly 16 and extend lengthwise of the bore 2 throughout a substantial portion of the length thereof at opposite ends of the body.

Certain of the vanes 17 have shoulder projections 18 thereon entering a counterbore 19 at a point along the length of the bore 2 such, for example, as at the outer end of the body 1. It will be noted from FIGS. 2 and 3 that each of the vane assemblies 16 has the shoulder projection 18 removed from one of the vanes or blades 17 while the other three vanes or blades in this example are provided with the shoulder projections 18 to enter the counterbore 19.

Retaining rings are indicated at 20 and 21, respectively at opposite ends of the body. Each of the retaining rings has an inside diameter corresponding with the diameter of the throat 2 so as to provide for uniform flow therethrough. Thus, the retainer rings 20 and 21 are seated in the counterbores 19. Each of the retaining rings has a slot 22 corresponding in position with the location of each shoulder projection 18 to register with the latter.

The retainer rings 20 and 21 are premachined and provided with locating devices to match the proper portions of the body 1 to assure of both matching and alignment thereof when installed in the field. Thus, in the embodiment illustrated, the retaining ring 20 has two such holding devices, such as screws 23 projecting into recesses 24 properly located within the body 1.

Likewise, the retaining ring 21 is provided with one locating device, such as a screw 25, inserted into a matching hole or groove forming a recess 26 in the body 1. These locating devices lock the retaining rings and likewise the vane assemblies 16 in their respective oriented positions relative to the body 1, either when initially assembled or when reassembled in the field.

In repair kits the parts are machined and aligned to a master body and may be assembled with the same match and alignment in a field installation. The master body corresponds in size and shape to the body 1. In assembling the parts in a master body one of the vane assemblies 16 is secured to the master body by hte screws 23 which project into the recesses 24. The other vane assembly 16 is initially assembled in the master body with a ring 21 which does not have a screw 25, so that the ring 21 and the assembly 16 can be rotated relative to the master body until the bearings 12 at each end of the shaft 11 and rotor 7 are aligned. The location of the locating hole or groove in the body then can be marked on the retaining ring 21 and a threaded hole is machined in the retaining ring where marked. A set screw 25 when threaded into the hole in the retaining ring 21 would engage the recess 26 to prevent rotation of the assembly 16 relative to the body 1. The meter body 1 is used in the field has recesses 24 and 26 positioned at exactly the same location as in the master body, so that when the vane assemblies and rotor are assembled in the field, the bearings 12 will be alligned and the rotor will turn freely.

The bearings in which the rotor of the flowmeter is mounted, are not always exactly centered. The bearings may cause the rotor shaft to be out of alignment as much as .006 inch. By selecting vanes which are off center approximately the same amount and then installing the vanes and the rotor in a master flowmeter body, one set of vanes can be rotated relatively to the other until the rotor turns freely. At this point, the center axis of the bearings in the vane assemblies is considered to be in alignment.

The locating devices 23–24 and 25–26 in the meter body are always in the same position. The retaining rings used with a particular vane assembly may be positioned in another meter body in exactly the same angular position. A replacement package may include both vane assemblies and the rotor and the retaining rings so as to assure that these can be assembled accurately in the body.

The retaining devices 23–24 and 25–26 hold the retaining rings 20 and 21 against both axial and circumferential shifting movement. These devices also have a minimum exposure to the flow of corrosive and abrasive carrying fluids.

The uniform internal diameter of the assembly reduces the turbulence in the meter and thereby improves the accuracy thereof.

A modified form of the invention is illustrated in FIGS. 4 and 5, showing locating pins which may be used when the holding device is not required to restrain the vane assembly from longitudinal movement.

In this modified form, the vane assembly 16 is mounted in the bore 2 of the body 1 and is held in place by a retaining ring 30. The retaining ring 30 is fitted into a counterbore 31 at one end of the bore 2 in the body and has a peripheral flange 32 engaging a seat 33 surrounding the bore. A suitable number of pins 34 extend through the flange 32 and into the body 1 to anchor the retaining ring 30 in place against circumferential shifting movement. The pins 34 can be secured in place in the body by cement or other suitable means.

In this form of the invention, a pipe line section 35 is aligned with the body 1, having a gasket 36 interposed therebetween. These parts are secured together by a suitable clamp 37, such as a pipe clamp.

In other respects, this form of the invention is assembled and functions in the manner described above with respect to FIGS. 1 to 3. The location of the hole in the flange 32 may be selected after assembly of the vanes and rotor in a master body as previously described regarding the hole for the screw 25.

While the invention has been illustrated and described in certain embodiments, it is recognized that variations and changes may be made therein without departing from the invention as set forth in the claims.

I claim:

1. A flowmeter of the character described, comprising a body having a passage therethrough for flow of fluid to be measured, a rotor in said passage, a shaft supporting the rotor for turning movement, vane assemblies mounted in the passage on opposite sides of the rotor and having bearing means for the shaft, each of said vane assemblies having a plurality of vanes rigidly secured to said bearing means and extending outwardly therefrom, said body having means forming a shoulder in said passage adjacent each end of said passage, a retaining ring in each end of said passage, said retainer rings each having one end abutting said shoulder means and having a plurality of axial slots, at least one vane of each vane assembly having a shoulder projecting into one of said retaining ring slots to restrict rotation of said vane assembly relative to said retaining ring, socket means on said body adjacent each of said retaining rings, and means on said retaining rings engaging said socket means for securing said retaining rings to said body at a predetermined rotational position relative to said body.

2. A flowmeter according to claim 1, wherein each retaining ring has substantially the same internal diameter as the passage in which the adjacent vane assembly is mounted, and said axial slots extend from said one end of the rings.

3. A flowmeter according to claim 1, wherein said socket engaging means includes a screw extending through each retaining ring in the body.

4. A flowmeter according to claim 1, wherein said vanes of at least one vane assembly are symmetrically disposed around said bearing means, a plurality of said vanes being aligned with said ring slots and each having a vane shoulder received in one of said slots, another one of said vanes overlapping said ring and being out of alignment with said ring slots, whereby the vane assembly and the retaining ring are assembled with the body in a predetermined rotational position relative thereto.

5. A flowmeter of the character described, comprising a body having a throat bore therethrough for flow of fluid to be measured, a rotor in said bore, a shaft supporting the rotor for turning movement, vane assemblies mounted in the body and having bearing supports for the shaft, each of said vane assemblies having a plurality of vanes extending outwardly into engagement with the bore, said body having a counterbore at opposite ends, a retaining ring in the bore around each vane assembly, at least one of said vanes having a shoulder projecting into said counterbore, said ring having an axial slot aligned with and receiving each of said vane shoulders, and means for securing each retaining ring against rotation relative to the body, whereby the vane shoulders and ring slots prevent rotation of the vanes relative to the body.

6. The flowmeter according to claim 5 wherein said securing means includes a socket in said body and a screw fastener extending radially through said ring and into said socket.

7. The flowmeter according to claim 5 wherein said securing means includes a radial flange on said retaining ring, a socket in said body, and pin means extending axially through said ring flange and into said socket.

8. A flowmeter according to claim 5, wherein each vane assembly has a vane peripheral edge inside the inner diameter of the adjacent retaining ring, and a second vane with a shoulder projection interfitting a portion of said adjacent retaining ring, whereby the relative rotational orientation of the vanes and ring is fixed.

References Cited

UNITED STATES PATENTS 3,301,053    1/1967    Walch et al. _____ 73—231
3,304,780    2/1967    Lee et al. _____ 73—231

FOREIGN PATENTS 476,936    5/1929    Germany.

RICHARD C. QUEISSER, *Primary Examiner.*

E. D. GILHOOLY, *Assistant Examiner.*

U.S. Cl. X.R.

331—97, 126; 315—39